Oct. 26, 1954
F. A. W. LEFFER
2,692,848
METHOD AND MEANS FOR CONTACTING SUBDIVIDED CATALYST
PARTICLES SUCCESSIVELY WITH A REACTANT STREAM
AND REGENERATING GAS STREAMS
Filed Jan. 20, 1951
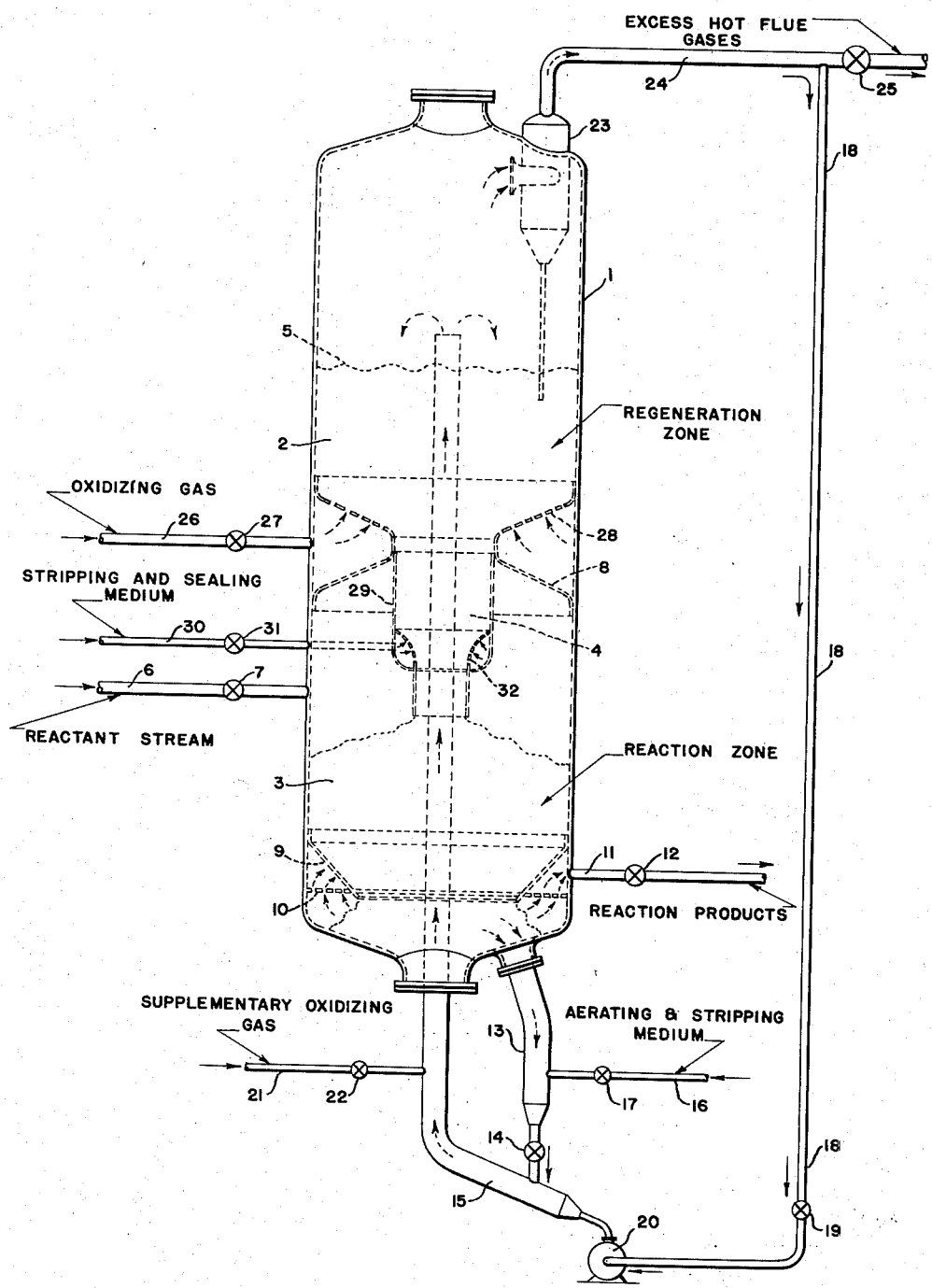
INVENTOR:
FREDERICK A. W. LEFFER
BY:
*Chester J. Giuliani*
*Philip T. Liggett*
ATTORNEYS:

Patented Oct. 26, 1954

2,692,848

UNITED STATES PATENT OFFICE 2,692,848

METHOD AND MEANS FOR CONTACTING SUBDIVIDED CATALYST PARTICLES SUCCESSIVELY WITH A REACTANT STREAM AND REGENERATING GAS STREAMS

Frederick A. W. Leffer, Riverside, Ill., assignor to Universal Oil Products Company, Chicago, Ill., a corporation of Delaware Application January 20, 1951, Serial No. 207,040

8 Claims. (Cl. 196—52)

This application is a continuation-in-part of my copending application Serial No. 35,256 filed June 25, 1948, now abandoned, which in turn is a continuation-in-part of my application Serial No. 706,914, filed October 31, 1946, now issued into Patent 2,459,824, dated January 25, 1949.

This invention relates to an improved method and means for contacting subdivided solid contact material successively with a hydrocarbonaceous reactant stream at endothermic conversion conditions and with different regenerating gas streams at exothermic reaction conditions. More specifically, the invention is directed to an improved hydrocarbon processing operation having a moving bed of subdivided catalyst particles continuously contacted in a reaction zone and in a regeneration zone, with the latter superimposed on the reaction zone and receiving contacted catalyst particles by means of a gas lift stream having a controlled oxygen content.

The utilization of a continuous, moving bed-type of operation and a superimposed relationship of reaction and regeneration zones is particularly advantageous in providing a compact unitary arrangement for a continuously operating conversion unit. The superimposed relationship of contacting zones permits maintaining a single continuous moving bed through each zone, with gravity flow of particles from the upper to the lower zone. However, it has been found in connection with the larger capacity units of this type that regeneration by unidirectional contact of the catalyst with the regenerating gas does not result in most effective regeneration and that the bed in the regeneration zone may become excessively deep, a considerable and undesirable pressure drop resulting from the passing of the regenerating gas stream through the bed. Reduction of the pressure drop accompanying the flow of the regenerating gas through the catalyst bed to a practically feasible value can be attained by employing a regeneration zone of a relatively wide cross-section area or alternatively by using a plurality of regeneration chambers or by other steps to preclude the passing of but a single gaseous regenerating stream through a deep moving bed of material, but these various alternatives have hitherto resulted in less satisfactory operations.

It is, therefore, a principal object of the present invention to provide an improved method and means for operating with superimposed contacting zones and at the same time with regeneration of the contaminated catalyst particles by the controlled introduction of oxygen-containing streams in two stages.

It is a further object of the present invention to provide a hot transporting gaseous medium which is of controlled low free oxygen content and effects the fluidized lift of contaminated catalyst particles from the lower end of a lower positioned reaction zone to the upper portion of a superimposed regeneration zone and simultaneously therewith one stage of regenerating contact, while countercurrently contacting a descending compact moving bed of the particles within the regeneration zone with a different oxygen containing stream, as a second stage of regenerating contact.

It is a still further object of the invention to provide controlled free oxygen concentrations in the fluidizing and transporting gas stream, as well as in the regenerating gas stream moving countercurrently upwardly through the moving bed in the regeneration zone, whereby there is substantially complete removal of the contaminating carbonaceous material from the catalyst particles with free oxygen reaching the upper end of the regenerating zone in such low concentrations that afterburning is precluded from occurring in the dilute phase of particles therein.

As used herein, the term "compact moving bed" refers to a body of solid particles in which the particles remain in contact with each other while they move all in the same direction and at practically the same rate with respect to the walls of the zone confining the bed, while the term "fluidized bed" means a mass of solid particles which exhibits the liquid-like characteristics of mobility, hydrostatic pressure, and an observable upper free surface or boundary zone across which a marked change in concentration of particles occurs.

In a broad aspect, the present method for effecting endothermic conversion of a hydrocarbonaceous reactant stream in the presence of subdivided solid catalyst particles comprises, passing the reactant stream through a downwardly moving bed of subdivided catalyst particles within a confined reaction zone under conversion conditions, withdrawing resulting fluid reaction products from the reaction zone, separately discharging contaminated catalyst particles from the lower portion of the reaction zone and commingling them with a hot transfer gas stream, fluidizing and lifting the contaminated particles by the transfer gas stream upwardly in a confined path extending through and in indirect heat exchange with the catalyst bed in the reaction zone to the upper portion of an elevated regeneration zone, maintaining a sufficiently low concentration of free oxygen in the transfer gas to burn a minor portion of the combustible contaminants from the particles in the confined path, discharging a mixed solids-gas stream substantially devoid of free oxygen from the confined path into the upper portion of the regeneration zone and permitting the solids to fall to the top of a descending bed of particles maintained within the regeneration zone, supplying a free oxygen-containing regenerating gas to the lower portion of the regeneration zone and passing it therein upwardly uniformly through the descending bed at a rate and with a free oxygen concentration which maintain this descending bed in a compact moving form and concomittantly effect the substantial combustion of the contaminating deposit on the catalyst particles in the compact moving bed and the maintenance of a gaseous atmosphere in the upper portion of the regeneration zone having a lower free oxygen content than would sustain after-burning above this bed, withdrawing hot combustion gases from the upper portion of the regeneration zone at a point above the compact moving bed therein, passing a stream of these hot combustion gases to the inlet of the confined path in an amount constituting at least a predominate portion of the aforesaid hot transfer gas stream, and continuously discharging hot regenerated catalyst particles from the lower portion of the regeneration zone by gravity flow into the upper portion of the reaction zone for contact with the hydrocarbonaceous reactant therein.

The hydrocarbon reactant stream may pass upwardly countercurrently to the descending bed of particles in the lower reaction zone; however, in a preferred operation, which generally is not equivalent to that using countercurrent contact, the reactant stream moves downwardly concurrently with the particles in a manner precluding fluidization and any accompanying bubbling or channeling of the fluid stream through the bed, such as may be obtained when relatively high upflow velocities of gasiform reactant are used which maintain the bed of catalyst particles in a psuedo-liquid or turbulent state. The apparatus preferred for performing the present method and more fully described hereinafter may be utilized in connection with contact operations utilizing either relatively solid inert refractory particles or subdivided solid particles undergoing conversion or particulated catalyst, but in general has its greatest utility in connection with various continuous catalytic conversion operations performed in the chemical and petroleum arts in accordance with the present method.

It has been recognized that solid refractory catalysts which have been contaminated or deactivated by carbonaceous deposit during their use in the performance of endothermic organic reactions including, by way of example, cracking, dehydrogenation, deulfurization, reforming, isomerization and related treatments of hydrocarbon oils, hydrocarbon gas mixtures, individual hydrocarbons and related hydrocarbonaceous materials may require treatment in several successive stages which may be maintained at different temperatures while utilizing the same or different kinds of regenerating fluids, in order to secure the reactivation under optimum conditions or to an optimum degree of activity. The present method constitutes an improved and particularly advantageous operation of this type of contacting and regenerating treatments. The solid catalyst particles may be formed of natural clays, oxides, or the like, or they may be of a synthetic type of composition suitable for catalyzing the contemplated reaction, such as, for example, the synthetic type of hydrocarbon cracking catalysts comprising silica composited with minor proportions of alumina, magnesia, zirconia, or alumina-zirconia, and the like.

The size of the solid catalyst particles is preferably sufficiently large to prevent excessive compaction as they move downwardly in a gravity flow from one zone to another and are preferably substantially spherical in nature so that they flow readily with little or no clogging or arching action and without appreciable attrition. Relatively large and uniform shaped particles also aid in preventing excessively high pressure drops for the fluid streams which are passed through the descending compact portions of the bed to effect the desired contact and conversions operations. However, the particle size, or more particularly their average bulk density must not be so large as to hinder their ready fluidization and transfer by the gas lift action through a confined path or riser line extending from the bottom of the lower reaction zone to the upper portion of the superimposed regeneration zone. For example, formed substantially spherical particles having a size of the order of 2 to 5 mm. average diameter are suitable for use in the present method.

It is a particular feature of the present invention to utilize a hot transporting gaseous medium which has a low oxygen concentration to effect the lifting and transferring of particles which have been contaminated by heavy carbonaceous deposits or coatings and are being withdrawn from the lower end of the reaction zone. The hot combustion gas mixture issuing from the upper end of the regeneration zone is peculiarly adapted, because of its high temperature and low free oxygen content, to serve as the predominate portion of the hot transporting medium or transfer gas. A small portion of the transfer gas stream may be air or oxygen which is blended with the commingled stream of particles and recirculated flue gas. Preferably, the initial oxygen concentration in the transporting gas stream that is the free oxygen concentration in stream at the point of its being commingled with the contaminated catalyst particles, will not exceed about 3.5% and more commonly will be of the order of 2%. Inasmuch as the oxygen addition is small, the resulting transporting gas stream is not materially cooled thereby. The predominate portion of the transfer gas stream is withdrawn from the upper end of the regeneration zone and is passed preferably in a substantially uncooled condition to the lower end of the confined path for commingling with the particles to be regenerated.

In a more specific embodiment, the present invention provides a method for effecting the endothermic conversion of a hydrocarbon reactant stream in the presence of subdivided solid catalyst particles with a two stage regeneration of contaminated particles which comprises introducing the hydrocarbon reactant stream into the upper portion of a confined reaction zone and passing it downwardly therethrough concurrently with a compact moving bed of the catalyst particles at conversion temperature, continuously withdrawing a resulting fluid product stream from the lower portion of the bed and the reaction zone and separately discharging contaminated catalyst particles from the lower end portion of the reaction zone, continuously commingling these contaminated catalyst particles with a hot gaseous transporting medium consisting predominately of flue gas, obtained as hereinafter set forth, and a small amount of free oxygen blended therewith, passing the resulting commingled stream of particles and transporting medium upwardly in a confined straight line path through and in indirect heat exchange with the bed within the reaction zone and a descending bed of particles maintained in a regeneration zone superimposed on the reaction zone, blending the free oxygen in such limited proportion with the flue gas that only a minor portion of the contaminants is burned from the particles in the confined path and the resulting transporting medium being discharged from this confined path into the upper portion of the regeneration zone is substantially devoid of free oxygen, permitting the transported particles to descend by gravity onto the top of the bed maintained within the lower portion of the regeneration zone and extending therefrom in a continuous downwardly moving compact column through a restricted passage way into the lower reaction zone and to the compact moving bed therein, introducing a free oxygen-containing regenerating gas into the lower portion of the regenerating zone and passing it countercurrently through the portion of the descending catalyst bed therein, controlling the oxygen content and the rate of supply of the regenerating gas to retain the descending bed in compact moving form in the regeneration zone and to effect the substantially complete burning and removal of combustible contaminants from the particles of the compact moving bed therein with formation and disengagement from this bed of a combustion gas of sufficiently low free oxygen concentration to preclude any substantial after-burning in the upper portion of the regeneration zone, discharging regenerated and heated catalyst particles from the lower end of the regeneration zone by gravity through said restricted passageway onto the bed in the reaction zone, discharging the resulting hot combustion gas mixture from the upper portion of the regeneration zone at a point above the compact moving bed therein; and passing a stream thereof as the aforesaid flue gas forming the predominate portion of the hot gaseous transporting medium to the inlet of the confined straight line path.

The gaseous regenerating medium supplied for the second regenerating stage by the stream introduced into the lower end of the regeneration zone, provides a considerably higher oxygen concentration than is provided by the gaseous transporting stream. The initial free oxygen concentration in the gas passing to the regeneration zone is at least 14% and more commonly that of air, namely about 20% oxygen. The mixture of gases disengaging from the compact moving bed of the regeneration zone into the upper portion of this zone and separating from the solids-gas stream discharged from the confined path has a low carbon monoxide content and an oxygen concentration generally not exceeding 2%, and normally substantially less than 2%, and provides a gaseous atmosphere practically entirely precluding after-burning in the upper portion of the regeneration zone. Thus resulting hot combustion gas stream recycled from the gas discharge of the regeneration zone to constitute a predominate portion of the transporting gas has less than 2% free oxygen concentration and may require a blending of air or free oxygen to provide a more desirable low oxygen concentration, such as from about 2% to about 35% by volume, in the transfer gas stream to bring about a substantial, though minor amount of removal of carbonaceous deposit from the catalyst particles in the first stage of regeneration during the elevation of the catalyst particles from the lower end of the reaction zone to the upper portion of the regeneration zone.

In order to impart the desired amount of oxygen to the transporting gas, where the recycle gas stream contains insufficient oxygen, i. e., less than between 1 and 2%, air is mixed with recycle gas in the proportion of from between 0 and 10 parts by volume of air to 100 parts by volume of the recycle gas, both component gas quantities being determined on the basis of equal temperature and pressure. Thus, the transfer gas mixture will generally contain less than 10% by volume of air and more than 90% by volume of recycle gas from the upper portion of the regenerating zone and may consist in some cases entirely of recycle gas.

In the preferred apparatus arrangement provided by this invention the elevated regeneration zone is directly over the reaction zone and in axial alignment therewith, so that a vertical riser conduit provides the confined path for transporting the catalyst particles from the lower end of the reaction zone to the upper portion of the regeneration zone. This arrangement also permits the continuous descending bed of catalyst particles to pass from the upper regeneration zone through a passageway of restricted cross-sectional area which serves simultaneously as catalyst downflow passageway, catalyst stripping zone and fluid sealing zone. This passageway is preferably of an annular cross-section circumscribing the riser conduit, so as to permit a compact moving column of the regenerated and heated catalyst particles to pass downwardly around and along the riser conduit onto the top of the descending bed in an enlarged cross-sectional area reaction zone. The preferred arrangement thus permits the maintenance of a single, continuous compact moving bed extending from an elevation below the upper or discharge end of the riser conduit downwardly through the regeneration zone, through the restricted passageway and through the reaction zone to the lower end of the latter. Steam or other relatively inert stripping medium is introduced into the restricted passageway or stripping zone at at least one point or elevation intermediate the upper and lower ends of this zone and at a sufficient pressure to serve as a sealing medium and prevent the flow of fluids from either of the regeneration zone and reaction zone into the other, thus preventing the intermixing of the hydrocarbonaceous reactant and regenerating gases.

An important advantage of the present method of operation resides in the ease of completely avoiding overheating and resultant permanent injury of the catalyst at any point of the catalyst cycle. The partial regeneration which is brought about in the confined straight line path simultaneously with the lifting of the contacted particles from the lower end of the reaction zone to the upper portion of the regeneration zone and which is limited to the combustion of a minor portion of the contaminants from the particles being thus transported is coupled with a dissipation of the combustion heat which is generated most rapidly upon the coming into contact of the transporting gas with the contaminated particles and progressively more slowly with the ascent of the mixed solids-gas stream through the confined transfer path. Combustion heat thus initially generated at a rapid rate is imparted to a substantial extent to the descending bed in the reaction zone and the reactant stream passing therethrough, and the benefit of this heat transfer is enhanced by passing the hydrocarbonaceous reactant stream downwardly concurrently with the descending bed through the reaction zone. This indirect heat transfer permits the first stage regeneration to take place at a substantially uniform temperature throughout the entire confined transfer path and moreover at practically the same temperature at which the second stage of regeneration is brought about in the descending bed in the regeneration zone. This heat exchange, moreover, renders unnecessary the supply of a cooling medium to the first regeneration stage, and loss of heat from the process at this stage of the regeneration is further avoided by utilizing a stream of the hot combustion gas mixture from the regeneration zone as at least the major component of the transfer gas in the confined transfer path. The rather low concentration of solid particles in the solids-gas mixture ascending in this path, relative to the considerably higher concentration of the catalyst particles in the compact moving bed in the regeneration zone, favors rapid combustion and the practically complete consumption of the free oxygen from the transfer gas within the confined transfer path in spite of the relatively higher speed of travel of the catalyst particles through this path.

The major portion of the combustible contaminants deposited on the catalyst particles in the reaction zone and remaining thereon upon their discharge from the riser conduit can be safely burnt therefrom during their downward travel in the compact moving bed in the regeneration zone in contact with a regenerating gas of considerably higher free oxygen concentration, air being usable directly and without diluent in most instances. However, when a lower oxygen concentration than that of air is desired for introduction into the compact moving bed in the regeneration zone a stream of the combustion gas mixture withdrawn from the upper portion of the regeneration zone may be blended in proper, controlled proportion with the air to be introduced into the lower portion of the regeneration zone.

An advantageous feature of the countercurrent flow during the second stage regeneration contact in the bed in the regeneration zone, in conjunction with the catalyst transfer in the confined path extending through the entire height of the particle bed in the regeneration zone, resides in the independent control which one has both over the circulation rate of the particulated catalyst through the entire system and the rate of flow of regenerating gas through the bed in the regeneration zone. The catalyst circulation rate depends directly on the rate of flow of the transfer gas through the confined up-flow path or riser conduit, and this rate of gas flow in the present method is controllable entirely independently of the rate of flow of the regenerating gas through the whole as well as any part of the bed in the regeneration zone. This independent control, moreover, permits to maintain countercurrent contact of the regenerating gas at such a rate with the descending bed in the regeneration zone that this bed is retained in compact moving form during substantially complete combustion of all residual combustible contaminants from the particles therein, thereby avoiding bubbling and channeling with escape of unused oxygen in substantial amounts with the combustion gases from the bed, as rather frequently encountered in fluidized catalyst beds undergoing regeneration. Thus, the necessity for injecting an inert diluent or quenching agent into the upper portion of the regenerating zone for the purpose of preventing after-burning above the bed therein is obviated. An important overall effect obtained in the present process with the aid of the two stage regeneration treatment thereof is the performance of the entire regeneration at a relatively low temperature level with a materially improved proportion of combustion heat transfer by the regenerated catalyst and by indirect heat transfer to the reaction zone and to the reactant undergoing conversion therein, relative to the amount of combustion heat rendered unavailable to the reaction zone in consequence of its removal as sensible heat in combustion gases, in comparison with previously proposed moving bed operations employing either a single stage regeneration treatment, or two stages of regeneration treatment with fluidized bed operation in both stages or with concurrent flow of catalyst and regenerating gas in both stages.

The accompanying drawing and the following description thereof will serve to illustrate the apparatus provided by this invention and accommodating the preferred arrangement of zones and a desired embodiment of the processing flow, while additional advantages and features of the present invention will be noted in connection therewith.

Referring now to the drawing, there is shown a vertically disposed and confined chamber 1, having an upper regeneration zone 2, a lower reaction zone 3 and an intermediate sealing and stripping zone 4. These zones are adapted to accommodate a continuous descending compact moving bed of catalyst particles, extending from the upper level indicated by the broken line 5 downwardly through the small cross-sectional area zone 4 and through the entire lower portion of the reaction zone 3. For the purpose of simplifying the following description, the apparatus and operation will be described with reference to a hydrocarbon oil cracking process utilizing substantially spherical and uniformly shaped catalyst particles, such as of silica-alumina, suitable for effecting the cracking of a gas oil stream into more desirable and more valuable products. In the present embodiment, the hydrocarbon charge stream is introduced by way of line 6 and control valve 7 into the upper portion of the reaction zone 3, below a partitioning member 8, so that the resulting vaporous stream may pass downwardly concurrently with the descending bed of particles maintained in the reaction zone 3.

The hydrocarbon stream to be converted in the presence of catalyst in some cases may be passed countercurrently to the descending bed of particles, but in accordance with the preferred embodiment of the present invention, a concurrent flow of hydrocarbon vapors and catalyst particles is maintained continuously in the reaction zone so that there is no channeling or bubbling of vapors through the particle bed, and resulting vaporous products are continuously withdrawn from the lower end of the reaction zone 3. A baffle 9 and a screen or perforate member 10 spaced between the lower periphery of the baffle 9 and the inside of the chamber wall provides means for collecting and withdrawing the conversion product stream and discharging it by way of line 11 and control valve 12 to suitable fractionation or recovery means, not shown.

The catalyst particles become contaminated with a carbonaceous deposit during their contact with the hydrocarbonaceous reactant undergoing conversion, and they are continuously passed from the lower end of the reaction zone by way of down-flow withdrawal conduit 13 and control valve 14 and discharged into the lower end of a suitable riser line or conduit 15, which in the present embodiment extends vertically and axially through the chamber 1 to the upper portion of the elevated regeneration zone 2. The contaminated catalyst particles which are withdrawn from the reaction zone into conduit 13 are continuously countercurrently contacted therein by a suitable stripping medium such as steam, introduced by way of line 16 and control valve 17, so that occluded and absorbed hydrocarbon vapor may be removed from the particles prior to their being brought into contact with oxygen-containing regenerating medium.

In accordance with the present invention, the hot gaseous transporting medium, comprising primarily flue gas which is withdrawn from the upper portion of the regeneration zone 2 and is obtained as will hereinafter be described more fully, is supplied to the contacted particles by way of line 18, control valve 19, and pump or blower 20 which discharges into the lower end of the riser line 15. Preferably, the line 18 is insulated and connects in a direct manner to the combustion gas outlet of chamber 1 so that there is substantially no cooling of the hot flue gas stream being discharged from the regeneration zone 2.

The hot recycle stream of flue gas commingles with the contaminated catalyst particles from the stand-pipe or withdrawal conduit 13 and effects their fluidization and gas lift through riser line 15 to the upper open end thereof within the elevated regeneration zone 2. In accordance with the present invention, the transporting medium is a stream of low oxygen concentration and provides incomplete burning and regeneration of catalyst particles while the latter are in a dispersed phase moving upwardly through the vertical straight line portion of riser line 15. In other words, the latter is an elongated tubular reactor for the co-current fluidized contacting and transporting of catalyst particles and for the combustion of a controlled, minor portion of the carbonaceous deposits thereon. The hot flue gas stream which is discharged from the upper end of the regenerating chamber, with a portion thereof passing by way of conduit 18 and pump 20, normally has such a low concentration of free oxygen that air or other supplementary oxidizing gas stream needs to be added to the recycled hot flue gas, and such air or oxidizing gas is introduced into the lower end of the riser line 15 by way of line 21 and valve 22. A sufficient quantity of air or oxygen is introduced and blended with the transporting medium to provide, as hereinbefore noted, a low oxygen concentration of not more than about 3.5% free oxygen, which permits discharging from the upper end of the riser line into the upper end of the regeneration zone a gaseous stream which is substantially devoid of free oxygen, thus precluding excessive burning and excessive heating of the catalyst particles within the riser conduit as well as contributing to the prevention of after-burning within the substantially gaseous phase existing above the descending bed of particles 5 within the upper portion of the regeneration zone 2.

Resulting combustion gases are discharged from the upper portion of regeneration zone by way of separator 23 and outlet conduit 24 having valve 25. The catalyst particles transferred through and issuing from the riser conduit 15 descend by gravity to the top of the bed 5 and subsequently pass in this continuously descending compact moving bed through the regeneration zone to the stripping zone 4. Air or other oxidizing medium containing free oxygen is introduced to the lower end of the regeneration zone by way of conduit 26 and control valve 27 in order that it may pass upwardly countercurrently to the descending bed of particles and provide countercurrent uniform contacting of the contaminated catalyst particles in a second stage of regeneration and reactivation. A suitable screen or perforated partitioning member 28 provide means for uniformly distributing the regenerating medium upwardly through the entire cross-sectional area of the descending bed of particles maintained within the regeneration zone 2.

The air or gaseous regenerating medium entering the lower portion of regeneration zone 2 normally has a substantially higher oxygen content than that within the tubular riser line 15, and this oxygen content, which is preferably at least 14% and more commonly about 20%, is correlated with the rate of supply of this medium through line 26 so that the predominate portion of the carbonaceous contaminants deposited on the catalyst particles in the reaction zone is removed in the bed within the regeneration zone 2 and the catalyst particles reaching the lower end of this zone are substantially free from these contaminants. The oxygen content is of course controlled so that the resulting flue gas or combustion gas mixture separating in the upper portion of the regeneration zone above the bed therein is low in carbon monoxide and is substantially devoid of free oxygen, or such that it is at least below about 2% free oxygen, in order to preclude any after-burning within the free zone above the bed of catalyst. The oxygen concentration within the regenerating gas stream entering line 26 and the rate of flow of this stream are balanced and controlled, not only to substantially complete the removal of carbonaceous matter from the particles in the descending bed in the elevated regeneration zone 2, but also to preclude fluidization of this bed, in order that there be no channeling or bubbling of material permitting the rapid by-passing of particles and the penetration of unused oxygen in any substantial concentration to the upper portion of the regeneration zone.

Reactivated catalyst particles continuously leave the lower portion of regeneration zone 2 and pass through an annular stripping zone 4 which is formed by a cylindrical section 29 depending from the baffle or partition 8 and circumscribing the riser line 15. Steam or other inert stripping and sealing medium is introduced by way of line 30 and valve 31 into a distributing port 32 of the annular stripping zone 4. The distributing port 32 is provided along the wall of section 29 in a substantially horizontal plane at an intermediate elevation of the height of section 29. A substantial portion of the stripping medium passes upwardly countercurrently to the descending catalyst particles and effects the stripping and removal of entrained combustion gases or regenerating medium which is introduced into the upper regeneration zone 2. Preferably, the vertical length of the stripping zone 4 and the port or header for introducing the stripping and sealing steam are arranged so that a major portion of the steam passes upwardly into the regenerating zone and a minor portion passes down into the reaction zone 3. In any event, the steam or other stripping and sealing medium is introduced at a pressure sufficiently high so that there is no interchange or passage of gaseous or vaporous medium from one of the superimposed contacting zones or sections of the unit through the zone 4 into the other. The resulting reactivated and stripped particles which continuously discharge from the lower end of the cylindrical section 29 spread out into the enlarged cross-section area of reaction zone 3, in the lower portion of chamber 1, and descend in a continuous moving bed in contact with the hydrocarbon reactant stream being continuously introduced by way of line 6.

The present arrangement of zones and processing flow is distinguished by a particular simplicity which permits the desired catalyzed reaction and the two stage regeneration of contacted catalyst particles to be performed in a small compact unitary apparatus with but a single continuous descending bed of catalyst particles extending through both upper and lower contacting sections. The placing of the regeneration zone directly over the reaction zone in conjunction with the preferred processing flow including upflow of regenerating gas through the compact moving bed in the elevated regeneration zone and down-flow of the hydrocarbonaceous reactant through the compact moving bed in the reaction zone also is particularly advantageous from the point of view of pressure distribution and flow control at any desired general level of operating pressure, which may be atmospheric or lower or higher than atmospheric pressure; the inlet pressures of the regenerating gas in line 26 and of the hydrocarbonaceous reactant in line 6 can be practically equalized and readily maintained constant during the operation so that no disturbing fluctuations occur at the inlet and outlet sides of the stripping zone 4 while any pressure fluctuations resulting from minor variations in the extent of reaction and/or regeneration can be accommodated most easily by regulation at the combustion gas outlet control valve 25 and the fluid product discharge control valve 12 without any adverse effect on the maintenance of a complete seal by a minimum of sealing fluid supplied through line 30 and control valve 31. Moreover, this particular, preferred flow favorably reduces the differential between the pressures at the inlet and outlet of the riser conduit (relative to an operation wherein hydrocarbonaceous reactant is passed upwardly through the descending bed in the reaction zone) so that only a small pressure differential across the suction and discharge sides of the hot flue gas blower 20 is required for transporting contacted catalyst at the desired rate from the reaction zone through the vertical riser conduit 15. The two stage regeneration of the contacted particles obviates the necessity of having relatively deep beds of material within a regeneration zone and accompanying high pressure drops where a large quantity of oxygen-containing gas must pass through the contact material and effect the desired burning and removal of contaminated matter. The present process flow further permits maintaining relatively shallow or medium depth catalyst beds within both the reaction zone and the elevated regeneration zone so that pressure drops are low in both of these zones, and it is unnecessary to provide either of these zones with a plurality of vertically spaced removal and return headers with intervening fluid conveying means or blowers for the purpose of overcoming the resistance to flow of gases through deep compact moving beds.

It may in addition be pointed out that the present drawing indicates an embodiment or construction for a unitary apparatus which is of relatively simple form having a minimum of internal parts, and avoiding the necessity of any expansion joints or the like. The partitioning member 8 may be of substantially conical form and deflectable in its construction so that it may accommodate temperature differentials. The cylindrical member 29 forming the stripping section 4 may in turn be attached to and depend from the inner periphery of the partitioning member 8, while the internal riser line 15 connects with the lower end of the unitary chamber 1 in a manner free to expand upwardly with changes in temperature. Suitable guide fins or substantially vertical ribs may of course be placed between the riser 15 and the cylindrical member 9 in order to maintain a proper spacing for the annular stripping zone 4, and in addition provide means for maintaining the long vertical riser line 15 in proper axial position. While the rate of flow of catalyst particles through the reaction and regeneration cycle can be regulated by adjusting the rate of supply of the gaseous transporting medium to the riser conduit, the apparatus is designed to superimpose on this control an independent control of the rate at which catalyst particles are admitted from the withdrawal conduit 13 to the riser conduit 15; the latter control is effected by means of the valve 14, which may be a star feeder valve, a slide valve or similar positive control valving mechanism, and serves to regulate the particle concentration in or density of the mixed stream ascending in the riser conduit in such manner that this concentration may be maintained, whenever so desired, at less than the maximum amount of solid particles that could be transported by a given amount of fluid supplied to the riser conduit 15 per unit time.

I claim as my invention:

1. A method for effecting endothermic conversion of a hydrocarbonaceous reactant stream in the presence of subdivided solid catalyst particles which comprises, passing said reactant stream through a downwardly moving bed of subdivided catalyst particles within a confined reaction zone under conversion conditions, withdrawing resultant fluid reaction products from said reaction zone, separately discharging contaminated catalyst particles from the lower portion of the reaction zone and commingling them with a hot transfer gas stream, fluidizing and lifting said particles by said transfer gas stream upwardly in a confined path extending through and in indirect heat exchange with the catalyst bed in said reaction zone to the upper portion of an elevated regeneration zone, maintaining a sufficiently low concentration of free oxygen in said transfer gas to burn a minor portion of the combustible contaminants from the particles in said confined path, discharging a mixed solids-gas stream substantially devoid of free oxygen from said confined path into the upper portion of said regeneration zone and permitting the solids to fall to the top of a descending bed of particles maintained within said regeneration zone, supplying a free oxygen-containing regenerating gas to the lower portion of said regeneration zone and passing it therein upwardly uniformly through said descending bed at a rate and with a free oxygen concentration which maintain said descending bed in a compact moving form and concomitantly effect the substantial combustion of the contaminating deposit on the catalyst particles in said compact moving bed and the maintenance of a gaseous atmosphere in the upper portion of said regeneration zone having a lower free oxygen content than would sustain after-burning above said bed, withdrawing hot combustion gases from the upper portion of said regeneration zone at a point above the compact moving bed therein, passing a stream of said hot combustion gases to the inlet of said confined path in an amount constituting at least a predominate portion of said hot transfer gas stream, and continuously discharging hot regenerated catalyst particles from the lower portion of said regeneration zone by gravity flow into the upper portion of said reaction zone for contact with the hydrocarbonaceous reactant therein.

2. A method for effecting endothermic conversion of a hydrocarbonaceous reactant stream in the presence of subdivided solid catalyst particles which comprises introducing said reactant stream into the upper portion of a confined reaction zone and passing it downwardly therethrough concurrently with a compact moving bed of said particles at conversion temperature, withdrawing a resulting fluid product stream from the lower portion of said bed and said reaction zone and separately discharging contaminated catalyst particles from the lower end portion of the reaction zone, commingling said contaminated catalyst particles with a hot transfer gas stream, fluidizing and lifting said particles by said transfer gas stream upwardly in a confined straight line path extending through and in indirect heat exchange with the catalyst bed in said reaction zone and upwardly through the major portion of a confined regeneration zone superimposed above said reaction zone, maintaining a low initial concentration of free oxygen in said transfer gas stream such that a minor portion of the combustible contaminants is burned from the particles in said confined path and a mixed solids-gas stream substantially devoid of free oxygen is discharged from said confined path into the upper portion of said regeneration zone, permitting the solid particles to gravitate from the discharged mixed stream onto the top of a descending bed of catalyst particles maintained within the regeneration zone, introducing a free oxygen-containing regenerating gas stream into the lower portion of said regeneration zone and passing it therein upwardly through the descending bed at a rate and with a free oxygen concentration which maintain said descending bed in a compact moving form and concomitantly effect the substantial combustion of the combustible contaminants on the particles therein with formation and disengagement from said descending bed of a combustion gas stream of sufficiently low free oxygen content to preclude any substantial after-burning in the upper portion of the regeneration zone, continuously withdrawing resulting hot combustion gases from the upper portion of said regeneration zone at a point above the bed therein and passing a stream thereof to the inlet of said confined path in a quantity constituting at least a predominate portion of said hot transfer gas stream, and continuously discharging resulting regenerated and heated catalyst particles from the lower portion of the regeneration zone by gravity flow into the upper portion of said reaction zone and onto the compact moving bed in the latter.

3. The method of claim 2 further characterized in that said hot transfer gas stream being withdrawn from the upper portion of said regeneration zone is passed in substantially uncooled condition to the inlet end of said confined path for commingling with said contaminated catalyst particles.

4. A method for effecting the endothermic conversion of a hydrocarbon reactant stream in the presence of subdivided solid catalyst particles which comprises introducing the hydrocarbon reactant stream into the upper portion of a confined reaction zone and passing it downwardly therethrough concurrently with a compact moving bed of said catalyst particles at conversion temperature, continuously withdrawing a resulting fluid product stream from the lower portion of said bed and said reaction zone and separately discharging contaminated catalyst particles from the lower end portion of the reaction zone, continuously commingling said contaminated catalyst particles with a hot gaseous transporting medium consisting predominately of flue gas obtained as hereinafter set forth, and a small amount of free oxygen blended therewith, passing the resulting commingled stream of particles and transporting medium upwardly in a confined straight line path through and in indirect heat exchange with the bed within the reaction zone and a descending bed of particles maintained in a regeneration zone superimposed on said reaction zone, blending the free oxygen in such limited proportion with the flue gas that only a minor portion of the contaminants is burned from the particles in said confined path and the resulting transporting medium being discharged therefrom into the upper portion of the regeneration zone is substantially devoid of free oxygen, permitting the transported particles to descend by gravity onto the top of the bed maintained within the lower portion of the regeneration zone and extending therefrom in a continuous downwardly moving compact column through a restricted passageway into the lower reaction zone and to the compact moving bed therein, introducing a free oxygen-containing regenerating gas into the lower portion of the regenerating zone and passing it countercurrently through the portion of the descending catalyst bed therein, controlling the oxygen content and the rate of supply of said regenerating gas to retain said descending bed in compact moving form in the regeneration zone and to effect the substantially complete burning and removal of combustible contaminants from the particles of the compact moving bed therein with formation and disengagement from the latter bed of a combustion gas of sufficiently low free oxygen concentration to preclude any substantial after-burning in the upper portion of said regeneration zone, discharging regenerated and heated catalyst particles from the lower end of the regeneration zone by gravity through said restricted passageway onto the bed in the reaction zone, discharging the resulting hot combustion gas mixture from the upper portion of the regeneration zone at a point above the compact moving bed therein, and passing a stream thereof as said flue gas forming the predominate portion of said hot gaseous transporting medium to the inlet of said confined straight line path.

5. A method for effecting the endothermic conversion of a hydrocarbon reactant stream in the presence of subdivided solid catalyst particles which comprises, passing said reactant stream downwardly concurrently with a compact moving bed of said particles at conversion temperature through a confined reaction zone, withdrawing a resulting fluid product stream from the lower portion of said reaction zone and separately discharging contaminated catalyst particles from the lower portion thereof, commingling said contaminated particles with a hot transfer gas stream and effecting the fluidized lifting of the particles by said transfer gas stream within a confined straight line path extending through and in indirect heat exchange with said compact bed in said reaction zone and through the lower portion of a confined regeneration zone superimposed above said reaction zone, with said hot transfer gas stream comprising substantially uncooled combustion gases from said regeneration zone and a free oxygen-containing stream commingled therewith in a proportion imparting to said transfer gas stream a free oxygen concentration of the order of from 2 to 3.5 per cent by volume, thereby effecting the combustion and removal of a minor portion of the contaminating carbonaceous matter on said particles within said confined path and discharging therefrom a resulting mixed solids-gas stream substantially devoid of free oxygen into the upper portion of said regeneration zone, permitting the lifted catalyst particles to descend by gravity onto the top of a descending bed of catalyst particles maintained within said regeneration zone, continuously introducing a free oxygen-containing regenerating gas stream into the lower portion of said regeneration zone and passing it separately through said descending bed therein, controlling the rate of supply of said regenerating gas stream in a manner maintaining said descending bed in a compact moving form and concomitantly controlling the free oxygen concentration of said regenerating gas stream within the range of from about 14 to about 20% by volume to effect the combustion and removal of substantially all of the remaining combustible contaminants from catalyst particles with formation of a combustion gas stream disengaging from said descending bed into the upper portion of the regeneration zone with a free oxygen concentration which is less than about 2% by volume and precludes any after-burning above said descending bed, continuously withdrawing the resulting hot combustion gas mixture from the upper portion of said regeneration zone at a point above said descending bed and passing a stream thereof to the inlet of said confined path in a quantity constituting a predominate portion of said hot transfer gas stream commingling with said contaminated catalyst particles, and continuously discharging the resulting regenerated and heated catalyst particles from the lower end of said descending bed and said regeneration zone by gravity in a compact moving column through a restricted passageway onto the top of said compact moving bed of particles in said reaction zone.

6. A contacting apparatus comprising a vertically disposed chamber, a vertical riser conduit extending from below the chamber upwardly through the bottom thereof and terminating with an open end in the upper portion of the chamber, a fluid inlet at the lower end of said riser conduit, a down-flow withdrawal conduit depending from the lower portion of the chamber for removing solid particles from the chamber and for introducing them to the lower end of said riser conduit for upward passage through the latter in admixture with fluid from said inlet, a partition extending inwardly from the vertical wall of the chamber toward an intermediate portion of said riser conduit so as to divide the chamber into an upper contacting section and a lower contacting section and having a central opening around the riser conduit for the downward passage of solid particles between the conduit and the inner periphery of said partition, a wall member depending from the inner periphery of said partition into said lower contacting section and spaced from said conduit to form with the latter an annular particle passageway in open communication with said lower contacting section, inlet means for introducing a sealing fluid to said passageway through said wall member at an intermediate point in the heighth thereof, means for introducing fluid to the lower portion of said upper contacting section, an outlet for fluid from the chamber at an elevation above the upper end of the riser conduit therein, and fluid inlet and outlet means at vertically spaced points of the chamber below said partition to permit fluid to be supplied to and withdrawn from said lower contacting section.

7. A contacting apparatus comprising a vertically disposed chamber, a vertical riser conduit extending from below the chamber upwardly through the bottom thereof and terminating with an open end in the upper portion of the chamber, a fluid inlet at the lower end of said riser conduit, a down-flow withdrawal conduit depending from the lower portion of the chamber for removing solid particles therefrom and connecting with the lower end of said riser conduit, means in said withdrawal conduit for controlling the admission of solid particles from said withdrawal conduit into said riser conduit and their upward flow through the latter in admixture with fluid from said inlet, a partition extending inwardly from the vertical wall of the chamber toward an intermediate portion of said riser conduit so as to divide the chamber into an upper contacting section and a lower contacting section and having a central opening around the riser conduit for the downward passage of solid particles between the riser conduit and the inner periphery of said partition, a wall member depending from the inner periphery of said partition into said lower contacting section and spaced from said conduit to form with the latter an annular particle passageway in open communication with said lower contacting section, inlet means for introducing a sealing fluid to said passageway through said wall member at an intermediate point in the height thereof, means for introducing fluid to the lower portion of said upper contacting section an outlet for fluid from the chamber at an elevation above the upper end of the riser conduit therein, fluid inlet means at the upper portion of said lower contacting section below said partition, and a fluid collecting header in the lower portion of said lower contacting section and having outlet conduit means communicating therewith for withdrawing fluid from the lower end portion of the chamber.

8. A contacting apparatus comprising a vertically disposed chamber, a vertical riser conduit extending from below the chamber upwardly through the bottom thereof and terminating with an open end in the upper portion of the chamber, a fluid inlet at the lower end of said riser conduit, a down-flow withdrawal conduit depending from the lower portion of the chamber for removing solid particles from the chamber and for introducing them to the lower end of said riser conduit for upward passage through the latter in admixture with fluid from said inlet, a partition extending inwardly from the vertical wall of the chamber toward an intermediate portion of said riser conduit so as to divide the chamber into an upper contacting section and a lower contacting section and having a central opening around the riser conduit for the downward passage of solid particles between the conduit and the inner periphery of said partition, means for introducing fluid to the lower portion of said upper contacting section, an outlet for fluid from the chamber at an elevation above the upper end of the riser conduit therein, fluid inlet means at the upper portion of said lower contacting section below said partition, and a fluid collecting header in the lower portion of said lower contacting section and having outlet conduit means communicating therewith for withdrawing fluid from the lower end portion of the chamber.

References Cited in the file of this patent

UNITED STATES PATENTS

| Number | Name | Date |
|---|---|---|
| 2,440,475 | Jacomini | Apr. 27, 1948 |
| 2,456,715 | Leffer | Dec. 21, 1948 |
| 2,459,824 | Leffer | Jan. 25, 1949 |
| 2,463,623 | Huff | Mar. 8, 1949 |
| 2,477,345 | Peltzer | July 26, 1949 |